United States Patent
Shaffer et al.

(10) Patent No.: US 11,713,901 B2
(45) Date of Patent: Aug. 1, 2023

(54) MAKEUP AIR CROSS-FLOW ENERGY RECOVERY SYSTEM ATOP AIR CONDITIONER

(71) Applicant: Haier US Appliance Solutions, Inc., Wilmington, DE (US)

(72) Inventors: Timothy Scott Shaffer, La Grange, KY (US); Eric Ormsby Sakal, Louisville, KY (US); Charles D. Robinson, III, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 27 days.

(21) Appl. No.: 17/338,834

(22) Filed: Jun. 4, 2021

(65) Prior Publication Data
US 2022/0390140 A1   Dec. 8, 2022

(51) Int. Cl.
| | |
|---|---|
| F24F 12/00 | (2006.01) |
| F24F 1/022 | (2019.01) |
| F24F 1/029 | (2019.01) |
| F24F 1/0323 | (2019.01) |
| F24F 1/0325 | (2019.01) |
| F24F 7/08 | (2006.01) |
| F24F 1/0284 | (2019.01) |

(52) U.S. Cl.
CPC ............ *F24F 12/006* (2013.01); *F24F 1/022* (2013.01); *F24F 1/029* (2019.02); *F24F 1/0323* (2019.02); *F24F 1/0325* (2019.02); *F24F 7/08* (2013.01); *F24F 1/0284* (2019.02)

(58) Field of Classification Search
CPC .................................................... F24F 12/006
See application file for complete search history.

(56) References Cited

U.S. PATENT DOCUMENTS

| | | | | |
|---|---|---|---|---|
| 5,257,736 | A * | 11/1993 | Roy | F24F 7/08 |
| | | | | 236/44 R |
| 7,802,443 | B2 * | 9/2010 | Wetzel | F24F 1/022 |
| | | | | 62/262 |
| 8,936,668 | B2 * | 1/2015 | Huizing | D01F 6/18 |
| | | | | 96/12 |
| 9,021,821 | B2 | 5/2015 | Dunnavant | |
| 10,281,162 | B2 * | 5/2019 | Mariotto | F28D 21/0015 |
| 10,527,367 | B2 | 1/2020 | Moffitt | |

(Continued)

FOREIGN PATENT DOCUMENTS

| | | |
|---|---|---|
| CN | 105003974 A | 10/2015 |
| DE | 4002560 A1 | 8/1991 |
| EP | 0661502 A2 | 7/1995 |

*Primary Examiner* — Christopher R Zerphey
(74) *Attorney, Agent, or Firm* — Dohty & Manning, P.A.

(57) ABSTRACT

An air conditioner unit includes a housing defining an outdoor portion and an indoor portion. A makeup air intake duct and a makeup air exhaust duct are disposed above the housing. The air conditioner unit also includes an air to air heat exchanger. The air to air heat exchanger includes a first inlet side attached to the makeup air intake duct, a second inlet side, a first outlet side, and a second outlet side attached to the makeup air exhaust duct. The air to air heat exchanger also includes one or more alternating top layers and bottom layers. The one or more top layers are in fluid communication with the first inlet side and the first outlet side, and the one or more bottom layers are in fluid communication with the second inlet side and the second outlet side.

18 Claims, 5 Drawing Sheets

(56) References Cited

U.S. PATENT DOCUMENTS

2012/0312035 A1* 12/2012 Boucher ................ F24F 1/022
  62/99
2019/0063780 A1   2/2019  Aldrich
2021/0239406 A1*  8/2021  Shimizu ............... F28D 9/0037

* cited by examiner

MAKEUP AIR CROSS-FLOW ENERGY RECOVERY SYSTEM ATOP AIR CONDITIONER

FIELD OF THE INVENTION

The present subject matter relates generally to vertical air conditioners, and more particularly to makeup air assemblies for air conditioning appliances having cross-flow energy recovery systems.

BACKGROUND OF THE INVENTION

Air conditioner units are conventionally utilized to adjust the temperature within structures such as dwellings and office buildings. In particular, one-unit type room air conditioner units, such as single-package vertical units (SPVU), may be utilized to adjust the temperature in, for example, a single room or group of rooms of a structure. A typical one-unit type air conditioner or air conditioning appliance includes an indoor portion and an outdoor portion. The indoor portion generally communicates (e.g., exchanges air) with the area within a building, and the outdoor portion generally communicates (e.g., exchanges air) with the area outside a building. Accordingly, the air conditioner unit generally extends through, for example, an outer wall of the structure. Generally, a fan may be operable to rotate to motivate air through the indoor portion. Another fan may be operable to rotate to motivate air through the outdoor portion. A sealed cooling system including a compressor is generally housed within the air conditioner unit to treat (e.g., cool or heat) air as it is circulated through, for example, the indoor portion of the air conditioner unit. One or more control boards are typically provided to direct the operation of various elements of the particular air conditioner unit.

Makeup air, e.g., additional fresh air from outside of the building, is typically provided with a large separate system remote from the air conditioner. Conventional separate systems can be costly. Further, because conventional separate systems are distant from the air conditioner, there is little opportunity to recover energy from previously treated air exhausted from the building.

As a result, further improvements to air conditioners may be advantageous. In particular, it would be useful to provide a makeup air system integrated with an air conditioner that provides for energy recovery from exhausted air.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, an air conditioner unit is provided. The air conditioner unit defines a mutually-perpendicular vertical direction, lateral direction, and transverse direction. The air conditioner unit includes a housing defining an outdoor portion and an indoor portion. An outdoor heat exchanger assembly is disposed in the outdoor portion. The outdoor heat exchanger assembly includes an outdoor heat exchanger and an outdoor fan. An indoor heat exchanger assembly is disposed in the indoor portion. The indoor heat exchanger assembly includes an indoor heat exchanger and an indoor fan. The air conditioner unit also includes a compressor in fluid communication with the outdoor heat exchanger and the indoor heat exchanger to circulate a refrigerant between the outdoor heat exchanger and the indoor heat exchanger. A makeup air intake duct having an intake inlet and an intake outlet is disposed above the housing. A makeup air exhaust duct having an exhaust inlet and an exhaust outlet is disposed above the housing. The air conditioner unit also includes an air to air heat exchanger. The air to air heat exchanger includes a first inlet side attached to the intake outlet of the makeup air intake duct, a second inlet side, a first outlet side, and a second outlet side attached to the exhaust inlet of the makeup air exhaust duct. The first inlet side and the second inlet side are perpendicular and adjacent to one another. The first outlet side and the second outlet side are perpendicular and adjacent to one another. The air to air heat exchanger also includes one or more top layers alternating with one or more bottom layers along the vertical direction. Each top layer is divided from each bottom layer. The one or more top layers are in fluid communication with the first inlet side and the first outlet side of the air to air heat exchanger. The one or more bottom layers are in fluid communication with the second inlet side and the second outlet side of the air to air heat exchanger.

In another exemplary aspect of the present disclosure, an air conditioner unit is provided. The air conditioner unit includes a housing defining an outdoor portion and an indoor portion. An outdoor heat exchanger assembly is disposed in the outdoor portion. The outdoor heat exchanger assembly includes an outdoor heat exchanger and an outdoor fan. An indoor heat exchanger assembly is disposed in the indoor portion. The indoor heat exchanger assembly includes an indoor heat exchanger and an indoor fan. The air conditioner unit also includes a compressor in fluid communication with the outdoor heat exchanger and the indoor heat exchanger to circulate a refrigerant between the outdoor heat exchanger and the indoor heat exchanger. A makeup air intake duct having an intake inlet and an intake outlet is disposed above the housing. A makeup air exhaust duct having an exhaust inlet and an exhaust outlet is disposed above the housing. The air conditioner unit also includes an air to air heat exchanger. The air to air heat exchanger includes a first inlet side attached to the intake outlet of the makeup air intake duct, a second inlet side, a first outlet side, and a second outlet side attached to the exhaust inlet of the makeup air exhaust duct. The first inlet side and the second inlet side are perpendicular and adjacent to one another. The first outlet side and the second outlet side are perpendicular and adjacent to one another. The air to air heat exchanger also includes one or more alternating top layers and bottom layers. Each top layer is divided from each bottom layer. The one or more top layers are in fluid communication with the first inlet side and the first outlet side of the air to air heat exchanger. The one or more bottom layers are in fluid communication with the second inlet side and the second outlet side of the air to air heat exchanger.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Reference now will be made in detail to embodiments of the invention, one or more examples of which are illustrated in the drawings. The detailed description uses numerical and letter designations to refer to features in the drawings. Like or similar designations in the drawings and description have been used to refer to like or similar parts of the disclosure. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "includes" and "including" are intended to be inclusive in a manner similar to the term "comprising." Similarly, the term "or" is generally intended to be inclusive (i.e., "A or B" is intended to mean "A or B or both"). The terms "upstream" and "downstream" refer to the relative flow direction with respect to fluid flow in a fluid pathway. For example, "upstream" refers to the flow direction from which the fluid flows, and "downstream" refers to the flow direction to which the fluid flows.

As used herein, terms of approximation, such as "generally," or "about" include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

Figure 1:
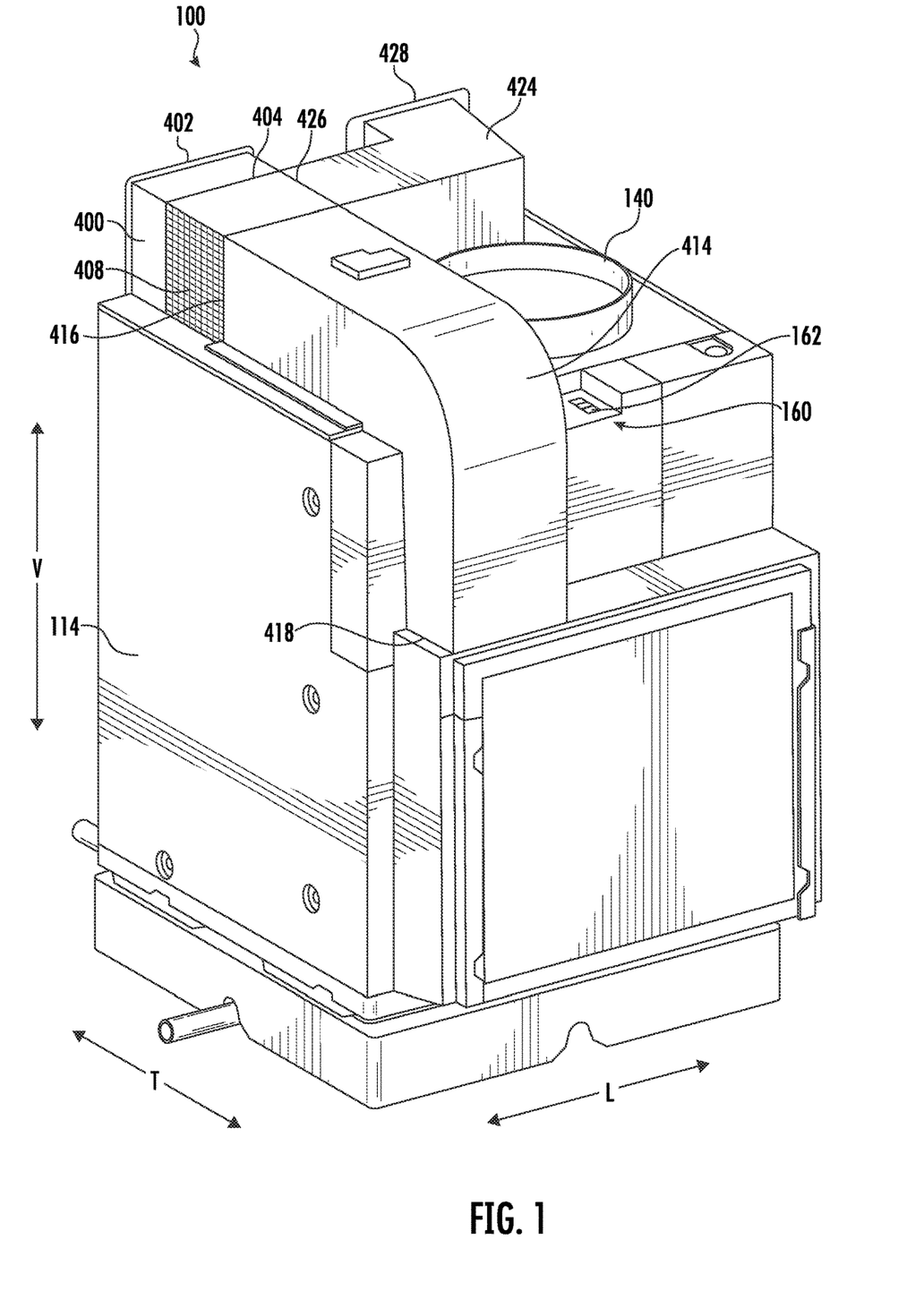
FIG. 1 provides a perspective view of an air conditioner unit according to one or more exemplary embodiments of the present disclosure.
Figure 2:
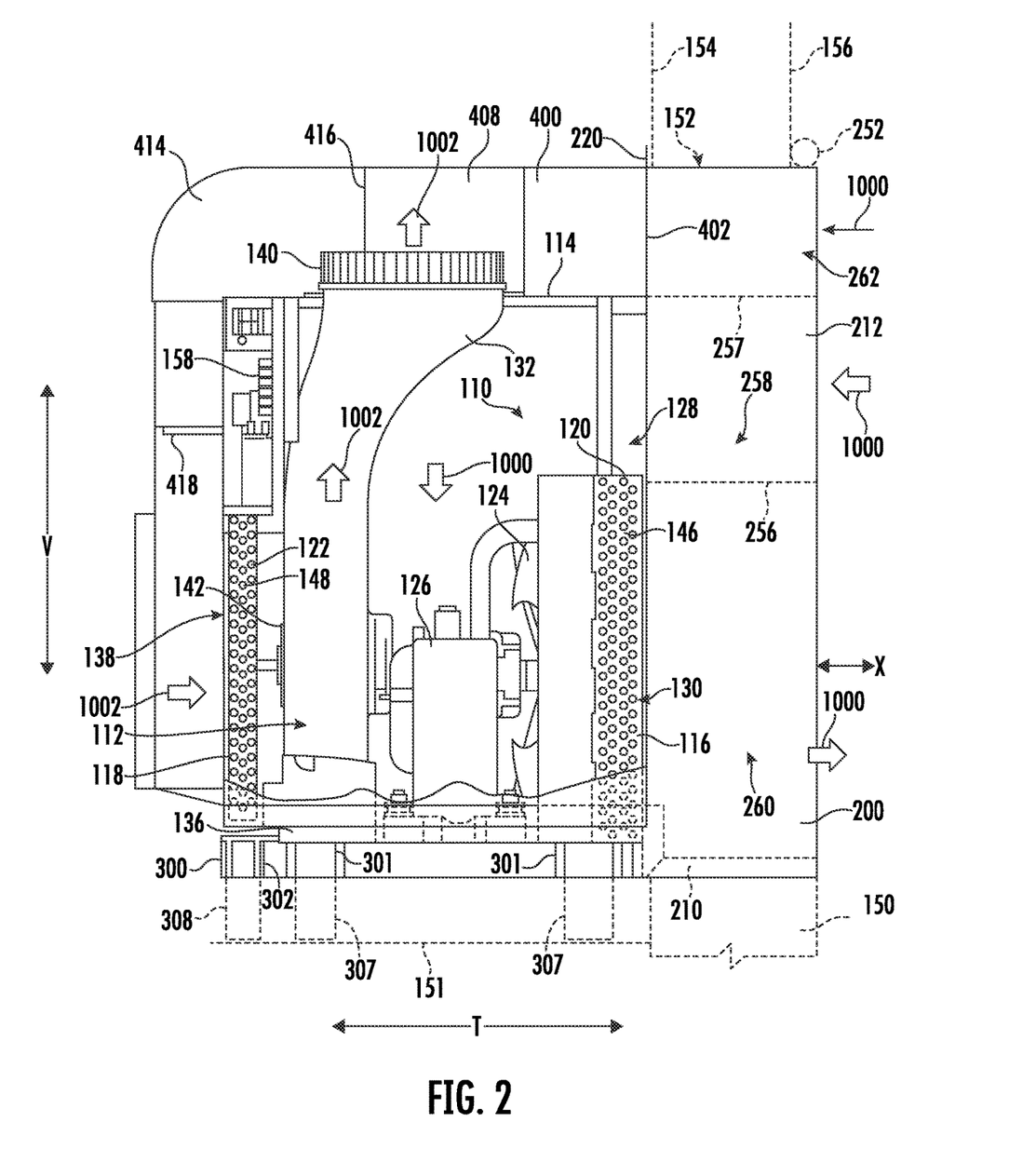
FIG. 2 provides a section view of the air conditioner unit of FIG. 1 according to one or more exemplary embodiments of the present disclosure.

Turning now to the figures, FIGS. 1 and 2 illustrate an exemplary air conditioner appliance or air conditioner unit (e.g., air conditioner 100). As shown, air conditioner 100 may be provided as a one-unit type air conditioner 100, such as a single-package vertical unit. Air conditioner 100 includes a package housing 114 supporting an indoor portion 112 and an outdoor portion 110.

Generally, air conditioner 100 defines a vertical direction V, lateral direction L, and transverse direction T. Each direction V, L, T is mutually perpendicular with every other direction, such that an orthogonal coordinate system is generally defined.

In some embodiments, housing 114 contains various other components of the air conditioner 100. Housing 114 may include, for example, a rear opening 116 (e.g., with or without a grille or grate thereacross) and a front opening 118 (e.g., with or without a grille or grate thereacross) may be spaced apart from each other along the transverse direction T. The rear opening 116 may be part of the outdoor portion 110, while the front opening 118 may be part of the indoor portion 112. Components of the outdoor portion 110, such as an outdoor heat exchanger 120, outdoor fan 124, and compressor 126 may be enclosed within housing 114 between front opening 118 and rear opening 116. In certain embodiments, one or more components are mounted on a base 136, as shown. The base 136 may be received on or within a drain pan 300.

During certain operations, air 1000 may be drawn to outdoor portion 110 through rear opening 116. Specifically, an outdoor inlet 128 defined through housing 114 may receive outdoor air 1000 motivated by outdoor fan 124. Within housing 114, the received outdoor air 1000 may be motivated through or across outdoor fan 124. Moreover, at least a portion of the outdoor air 1000 may be motivated through or across outdoor heat exchanger 120 before exiting the rear opening 116 at an outdoor outlet 130. It is noted that although outdoor inlet 128 is illustrated as being defined above outdoor outlet 130, alternative embodiments may reverse this relative orientation (e.g., such that outdoor inlet 128 is defined below outdoor outlet 130) or provide outdoor inlet 128 beside outdoor outlet 130 in a side-by-side orientation, or another suitable orientation.

As shown, indoor portion 112 may include an indoor heat exchanger 122, and an indoor fan 142, e.g., a blower fan 142 as in the illustrated example embodiment. These components may, for example, be housed behind the front opening 118. A bulkhead may generally support or house various other components or portions thereof of the indoor portion 112, such as the blower fan 142. The bulkhead may generally separate and define the indoor portion 112 and outdoor portion 110 within housing 114.

During certain operations, air 1002 may be drawn to indoor portion 112 through front opening 118. Specifically, an indoor inlet 138 defined through housing 114 may receive indoor air 1002 motivated by blower fan 142. At least a portion of the indoor air 1002 may be motivated through or across indoor heat exchanger 122 before passing to a duct 132. The indoor air 1002 may be motivated (e.g., by fan 142) into and through the duct 132 and returned to the indoor area of the room through an indoor outlet 140 defined through housing 114 (e.g., above indoor inlet 138 along the vertical direction V). Optionally, one or more conduits (not pictured) may be mounted on or downstream from indoor outlet 140 to further guide air 1002 from air conditioner 100. It is noted that although indoor outlet 140 is illustrated as generally directing air upward, it is understood that indoor outlet 140 may be defined in alternative embodiments to direct air in any other suitable direction.

Outdoor and indoor heat exchangers 120, 122 may be components of a thermodynamic assembly (i.e., sealed system), which may be operated as a refrigeration assembly (and thus perform a refrigeration cycle) or, in the case of the heat pump unit embodiment, a heat pump (and thus perform a heat pump cycle). Thus, as is understood, exemplary heat pump unit embodiments may be selectively operated to perform a refrigeration cycle at certain instances (e.g., while in a cooling mode) and a heat pump cycle at other instances (e.g., while in a heating mode). By contrast, exemplary A/C exclusive unit embodiments may be unable to perform a heat pump cycle (e.g., while in the heating mode), but still perform a refrigeration cycle (e.g., while in a cooling mode).

The sealed system may, for example, further include compressor 126 (e.g., mounted on base 136) and an expansion device (e.g., expansion valve or capillary tube—not pictured), both of which may be in fluid communication with the heat exchangers 120, 122 to flow refrigerant therethrough, as is generally understood. The outdoor and indoor heat exchangers 120, 122 may each include coils 146, 148, as illustrated, through which a refrigerant may flow for heat exchange purposes, as is generally understood.

A plenum 200 may be provided to direct air to or from housing 114. When installed, plenum 200 may be selectively attached to (e.g., fixed to or mounted against) housing 114 (e.g., via a suitable mechanical fastener, adhesive, gasket, etc.) and extend through a structure wall 150 (e.g., an outer wall of the structure within which air conditioner 100 is installed) and above a floor 151. In particular, plenum 200 extends along an axial direction X (e.g., parallel to the transverse direction T) through a hole or channel 152 in the structure wall 150 that passes from an internal surface 154 to an external surface 156. Optionally, a caulk bead 252 (i.e., adhesive or sealant caulk) may be provided to join the plenum 200 to the external surface 156 of structure wall 150 (e.g., about or outside from wall channel 152).

The plenum 200 includes a duct wall 212 that is formed about the axial direction X (e.g., when mounted through wall channel 152). Duct wall 212 may be formed according to any suitable hollow shape, such as conduit having a rectangular profile (shown), defining an air channel 210 to guide air therethrough. Moreover, duct wall 212 may be formed from any suitable non-permeable material (e.g., steel, aluminum, or a suitable polymer) for directing or guiding air therethrough. In certain embodiments, plenum 200 further includes an outer flange 220 that extends in a radial direction (e.g., perpendicular to the axial direction X) from duct wall 212. Specifically, outer flange 220 may extend radially outward (e.g., away from at least a portion of the axial direction X or the duct wall 212).

In some embodiments, plenum 200 includes a divider wall 256 within air channel 210. When assembled, divider wall 256 defines a separate upper passage 258 and lower passage 260. For instance, divider wall 256 may extend along the lateral direction L from one lateral side of plenum 200 to the other lateral side. Generally, upper passage 258 and lower passage 260 may divide or define two discrete air flow paths for air channel 210. When assembled, upper passage 258 and lower passage 260 may be fluidly isolated by divider wall 256 (e.g., such that air is prevented from passing directly between passages 258 and 260 through divider wall 256, or another portion of plenum 200). Upper passage 258 may be positioned upstream from outdoor inlet 128. Lower passage 260 may be positioned downstream from outdoor outlet 130.

Figure 3:
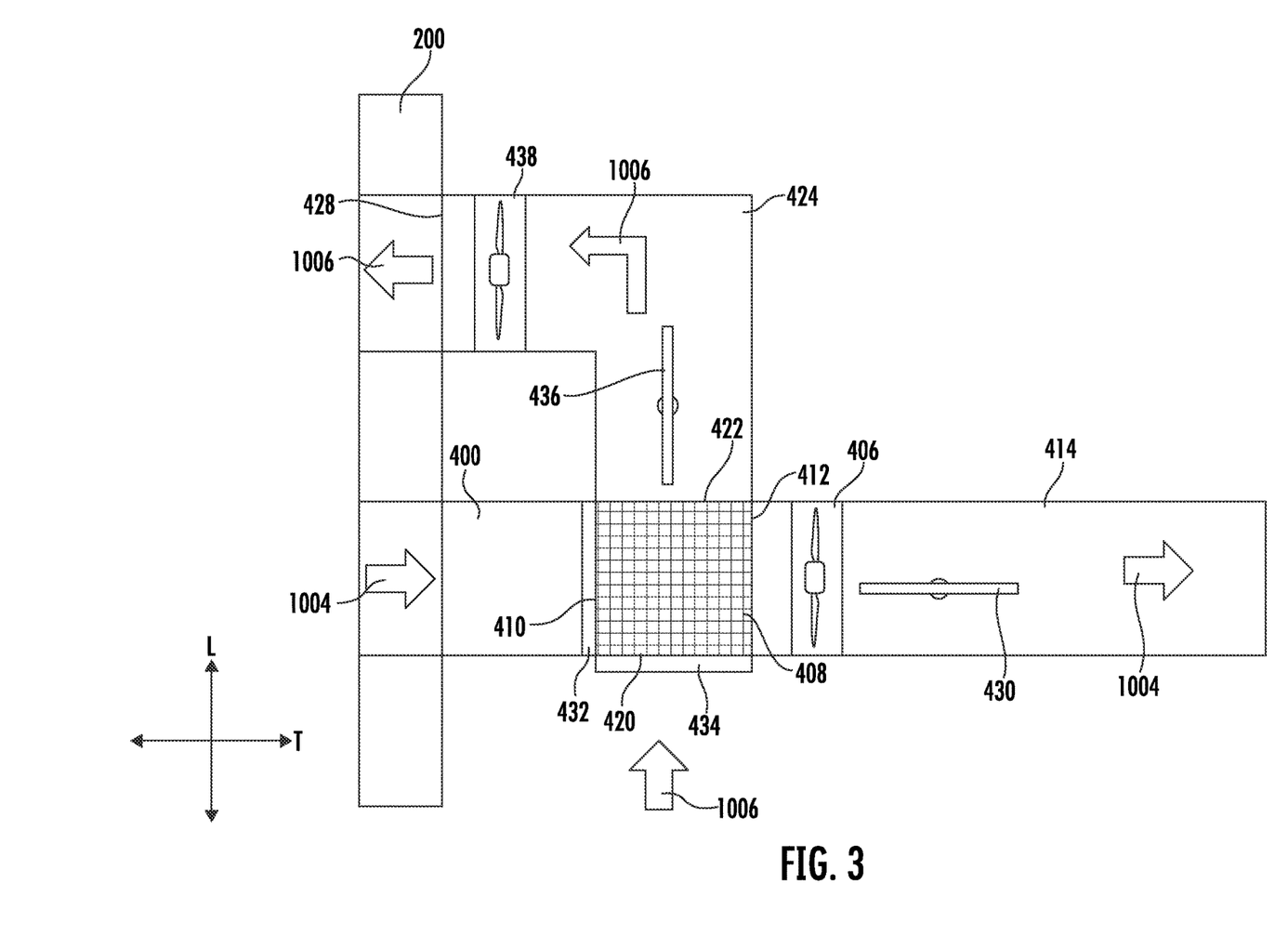
FIG. 3 provides a schematic diagram of a makeup air system with cross-flow energy recovery features according to one or more exemplary embodiments of the present disclosure, which may be incorporated into an air conditioner unit such as the air conditioner unit of FIG. 1.

The plenum 200 may further include a second divider wall 257 which separates a makeup air passage 262 from the remainder of the air channel 210, such as from the upper passage 258 and the lower passage 260. For example, the makeup air passage 262 may be positioned directly above the upper passage 258, whereby the second divider separates and partially defines the makeup air passage 262 and the upper passage 258, e.g., as in the exemplary embodiment illustrated in FIG. 2. Similar to the divider wall 256 described above, the second divider wall 257 may extend along the lateral direction L from one lateral side of plenum 200 to the other lateral side. The makeup air passage 262 may thereby define a discrete air flow path within air channel 210 which is separate and distinct from the upper and lower passages 258 and 260. When assembled, the makeup air passage 262 may be fluidly isolated by the second divider wall 257 from one or both of the upper passage 258 and lower passage 260, e.g., such that air is prevented from passing directly between the makeup air passage 262 and the upper and lower passages 258 and 260 through the second divider wall 257, or any other portion of plenum 200). The makeup air passage 262 may be positioned upstream from a makeup air intake duct 400. In some embodiments, outdoor air 1000 may optionally be drawn into the makeup air intake duct 400 by a makeup air intake fan, e.g., a variable speed fan such as a muffin fan 406 (see, e.g., FIG. 3), via the makeup air passage 262, thereby forming a flow of intake air 1004 (FIG. 3). The makeup air intake duct 400 may extend from an intake inlet 402 at the makeup air passage 262 of the plenum 200 to an intake outlet 404 at a first inlet side 410 of an air to air heat exchanger 408, which will be described in more detail below. The makeup air assembly may further include an air intake connector duct 414 extending from a first end 416 attached to the air to air heat exchanger 408 to a second end 418 at the indoor portion 112 of the housing 114, e.g., upstream of the indoor inlet 138, whereby outdoor air, e.g., makeup air, may be provided directly to the indoor portion 112 of the air conditioner 100 via the makeup air intake duct 400, air to air heat exchanger 408, and air intake connector duct 414. Also, as seen in FIG. 1, the air conditioner unit 100 may further include a makeup air exhaust duct 424 that extends from an exhaust inlet 426 at a second outlet side 422 (FIG. 3) of the air to air heat exchanger 408 to an exhaust outlet 428 at the makeup air passage 262 of the plenum 200. Thus, the ducts 400, 414, and 424 described herein, and the air to air heat exchanger 408, may be components of a makeup air system or makeup air assembly, which will be described in more detail below.

The operation of air conditioner 100 including compressor 126 (and thus the sealed system generally), indoor fan 142, outdoor fan 124, and other suitable components may be controlled by a control board or controller 158. Controller 158 may be in communication (via for example a suitable wired or wireless connection) to such components of the air conditioner 100. By way of example, the controller 158 may include a memory and one or more processing devices such as microprocessors, CPUs or the like, such as general or special purpose microprocessors operable to execute programming instructions or micro-control code associated with operation of air conditioner 100. The memory may be a separate component from the processor or may be included onboard within the processor. The memory may represent random access memory such as DRAM, or read only memory such as ROM or FLASH.

Air conditioner 100 may additionally include a control panel 160 (FIG. 1) and one or more user inputs 162, which may be included in control panel 160. The user inputs 162 may be in communication with the controller 158. A user of the air conditioner 100 may interact with the user inputs 162 to operate the air conditioner 100, and user commands may be transmitted between the user inputs 162 and controller 158 to facilitate operation of the air conditioner 100 based on such user commands. A display (not shown) may additionally be provided in the control panel 160, and may be in communication with the controller 158. The display may, for example be a touchscreen or other text-readable display screen, or alternatively may simply be a light that can be activated and deactivated as required to provide an indication of, for example, an event or setting for the air conditioner 100.

Also as may be seen in FIG. 2, in some instances when the plenum 200 is installed within the wall 150 above the floor 151, the remainder of the air conditioner unit 100 may be suspended or cantilevered from the plenum 200. In order to avoid such cantilever, one or more support legs 307 and/or 308 may be provided between the drain pan 300 and the floor 151, whereby at least some of the weight of the remaining components of the air conditioner unit 100 is shifted off of the plenum 200. Where the installation height of the plenum 200 above the floor 151 varies, the required height of the leg(s) 307 and/or 308 will also vary. Thus, the leg(s) 307 and/or 308 may be cut in the field and custom-fitted to the specific installation.

The drain pan 300 may include one or more sockets which are configured to receive the leg(s) 307 and/or 308. For example, as illustrated in FIG. 2, the drain pan 300 may include a first socket 301 and a second socket 302. As illustrated in FIG. 2, the socket(s) 301 and/or 302 may be positioned opposite the plenum 200 along the transverse direction T. For example, the plenum 200 may be positioned at a first transverse end of the drain pan 300 and the socket(s) 301/302 may be positioned opposite the plenum 200 at or near a second transverse end of the drain pan 300. Also as may be seen in FIG. 2, in some embodiments the drain pan 300 may also or instead include one or more of the sockets 301 and/or 302 at the other end of the pan 300, e.g., proximate the plenum 200. In various embodiments, one or both of the sockets 301 and 302 may be provided. In some embodiments, each socket 301 and 302 may be one of a pair of matching shaped sockets which are spaced apart along the lateral direction L and aligned along the transverse direction T.

The material for the leg(s) 307 and/or 308 may be any suitable material which is strong enough to bear the weight of the housing 114 and drain pan 300. For example, materials which are likely to be readily available during installation of the air conditioner unit and which can be suitable for forming the leg(s) 307 and/or 308 include building materials such as lumber, e.g., dimensional lumber such as a nominal two-inch-by-four-inch board, commonly referred to as a two-by-four, or plumbing, e.g., PVC piping having sufficient size (e.g., outer diameter, wall thickness, etc.). Thus, in some embodiments, the socket, e.g., first socket 301, may have a rectangular cross-section and may thereby be configured to receive a leg 307 made of lumber, such as a two-by-four leg, a two-by-six leg, or a four-by-four leg, etc. Additionally, in some embodiments, the socket, e.g., the second socket 302, may be cylindrical and may thereby be configured to receive a round, e.g., cylindrical, leg 308, such as a piece of piping, e.g., a PVC pipe as mentioned above, or, as another example, a steel pipe or other tubular or solid round leg 308.

As mentioned above, the air conditioner 100 may include a makeup air assembly. A schematic diagram of the makeup air assembly according to one or more exemplary embodiments of the present disclosure is provided in FIG. 3. As illustrated in FIG. 3, the makeup air assembly may include energy recovery features, such as cross-flow energy recovery features. As may be seen in FIG. 3 and as will be explained in more detail below, the makeup air assembly may include an air to air heat exchanger 408, through which a flow of intake air 1004 and a flow of exhaust air 1006 cross each other, e.g., a cross-flow air to air heat exchanger. For example, the cross-flow may include the intake air 1004 and the exhaust air 1006 each flowing generally perpendicularly to the other.

As illustrated in FIG. 3, the intake air 1004 may enter through the plenum 200 at and through the makeup air intake duct 400, such as at the intake inlet 402 (FIG. 1) of the makeup air intake duct 400. As mentioned above, in some embodiments, the intake air 1004 may be drawn into the makeup air intake duct 400 as a result of reduced pressure within the indoor portion 112 of the air conditioner 100, e.g., without the use of a fan in the makeup air system. In other embodiments, a makeup air intake fan 406 may be provided in one of the makeup air intake duct 400 and the air intake connector duct 414. For example, as illustrated in FIG. 3, the makeup air intake fan 406 may be positioned in the air intake connector duct 414 downstream of the air to air heat exchanger 408 and upstream of a makeup air intake damper 430.

The makeup air intake duct 400 may extend to the air to air heat exchanger 408. For example, the intake outlet 404 (FIG. 1) may be connected to the air to air heat exchanger 408, such as to a first inlet side 410 of the air to air heat exchanger 408. The intake air 1004 may flow through the air to air heat exchanger 408 from the first inlet side 410 to a first outlet side 412 which is parallel to and opposite of the first inlet side 410. A dust filter 432 may also be provided, e.g., at the first inlet side 410 of the air to air heat exchanger 408.

From the air to air heat exchanger 408, the intake air 1004 may flow to the indoor portion 112 of the air conditioner 100 via the air intake connector duct 414. For example, the air intake connector duct 414 may extend from a first end 416 to a second end 418. The first end 416 of the air intake connector duct 414 may be connected to the first outlet side 412 of the air to air heat exchanger 408. The second end 418 of the air intake connector duct 414 may be connected to the indoor portion 112 of the air conditioner unit 100. Thus, makeup air from outdoors may be provided to the conditioned space via the makeup air intake duct 400, the air intake connector duct 414, and the indoor portion 112 of the air conditioner unit 100, such as through the front opening 118.

The incoming intake air 1004 may be warmer (e.g., have a higher sensible heat) and more humid (e.g., have a higher latent heat) than the interior air or indoor air in the conditioned space. Accordingly, the exhaust air 1006 from the conditioned space to the outside may be cooler and drier than the intake air 1004. The exhaust air 1006 may flow into the air to air heat exchanger 408 at a second inlet side 420 (and through a dust filter 434), and may flow through the air to air heat exchanger 408 from the second inlet side 420 to a second outlet side 422. As may be seen, e.g., in FIG. 3, in some embodiments the first inlet side 410 and the second inlet side 420 may be perpendicular and adjacent to one another. When the intake air 1004 and the exhaust air 1006 flow through the air to air heat exchanger 408, heat energy may be exchanged between the air flows, such as about latent and sensible energy. For example, the incoming intake air 1004 may be cooled and dried as a result of such exchange, e.g., sensible energy may be transferred from the intake air 1004 to the exhaust air 1006 in the air to air heat exchanger 408, thereby cooling the intake air 1004, and latent energy may be transferred from the intake air 1004 to the exhaust air 1006 in the air to air heat exchanger 408, thereby drying (reducing the humidity of) the intake air 1004.

From the air to air heat exchanger 408, the exhaust air 1006 may flow into a makeup air exhaust duct 424. For example, the makeup air exhaust duct 424 may be connected to the second outlet side 422 of the air to air heat exchanger 408, such as an exhaust inlet 426 (FIG. 1) of the makeup air exhaust duct 424 may be connected to the second outlet side 422 of the air to air heat exchanger 408. In some embodiments, e.g., as illustrated in FIG. 3, the first outlet side 412 and the second outlet side 422 may be perpendicular and adjacent to one another. The makeup air exhaust duct 424 may extend from the exhaust inlet 426 to an exhaust outlet 428 at the plenum 200, whereby the exhaust air 1006 is directed from the second outlet side 422 of the air to air heat exchanger 408 to the plenum 200, and thus to the outdoors, via the makeup air exhaust duct 424.

In some embodiments, the makeup air system may include a makeup air exhaust fan 438, which may be a variable speed fan, positioned in the makeup air exhaust duct 424, such as downstream of the air to air heat exchanger 408 and downstream of an exhaust damper 436.

Figure 4:
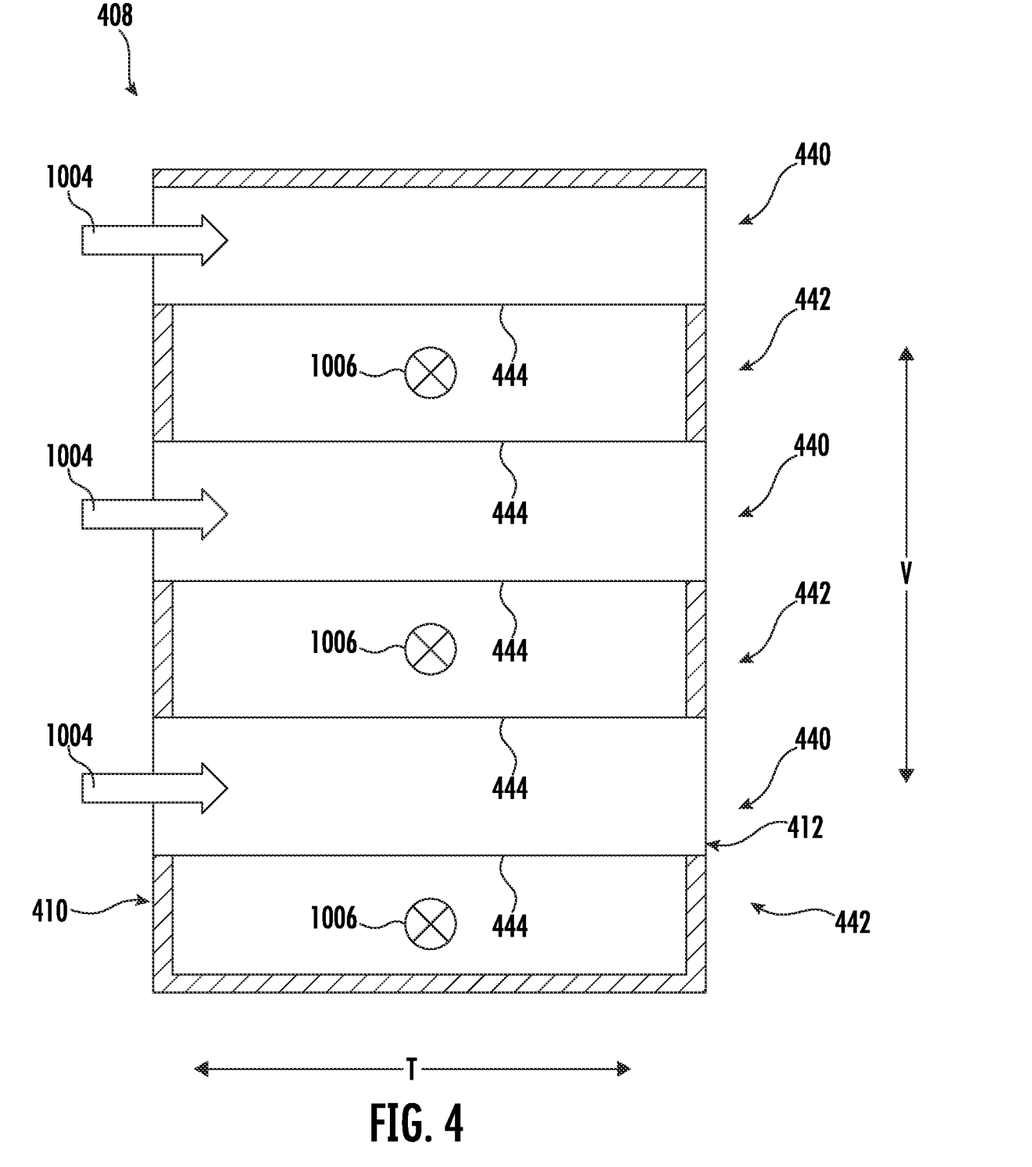
FIG. 4 provides a cross section view of an air to air heat exchanger according to one or more exemplary embodiments of the present disclosure, which may be incorporated into an air conditioner unit such as the air conditioner unit of FIG. 1.

Turning now to FIG. 4, the air to air heat exchanger 408 is depicted in a schematic cross section view. As may be seen in FIG. 4, the air to air heat exchanger 408 may extend generally along the transverse direction T from the first inlet side 410 to the first outlet side 412. The air to air heat exchanger 408 may include a plurality of layers, such as alternating top layers 440 and bottom layers 442 which are defined along the vertical direction V. In the example embodiment illustrated in FIG. 4, the air to air heat exchanger 408 includes three pairs of top and bottom layers 440 and 442, however, in other embodiments, any number of pairs of layers may be provided, such as one pair (e.g., two layers, one top layer 440 and one bottom layer 442), or two pairs of layers, or more than three pairs of layers 440 and 442. As may be seen in FIG. 4, the top layers 440 may provide fluid communication from the first inlet side 410 to the first outlet side 412, whereby the intake air 1004 flows through the top layers 440 of the air to air heat exchanger 408. Also as may be seen in FIG. 4, the layers are divided from each other, e.g., each top layer 440 is divided from each bottom layer 442. As mentioned above, the makeup air system of the present disclosure may include cross-flow energy recovery features, such as the air to air heat exchanger 408 may be a cross-flow heat exchanger. As may be seen in FIG. 4, the exhaust air 1006 flows generally perpendicularly to the intake air 1004, e.g., the exhaust air 1006 flows into the page in the view of FIG. 4, while the intake air 1004 flows from left to right across the page in the view of FIG. 4.

Figure 5:
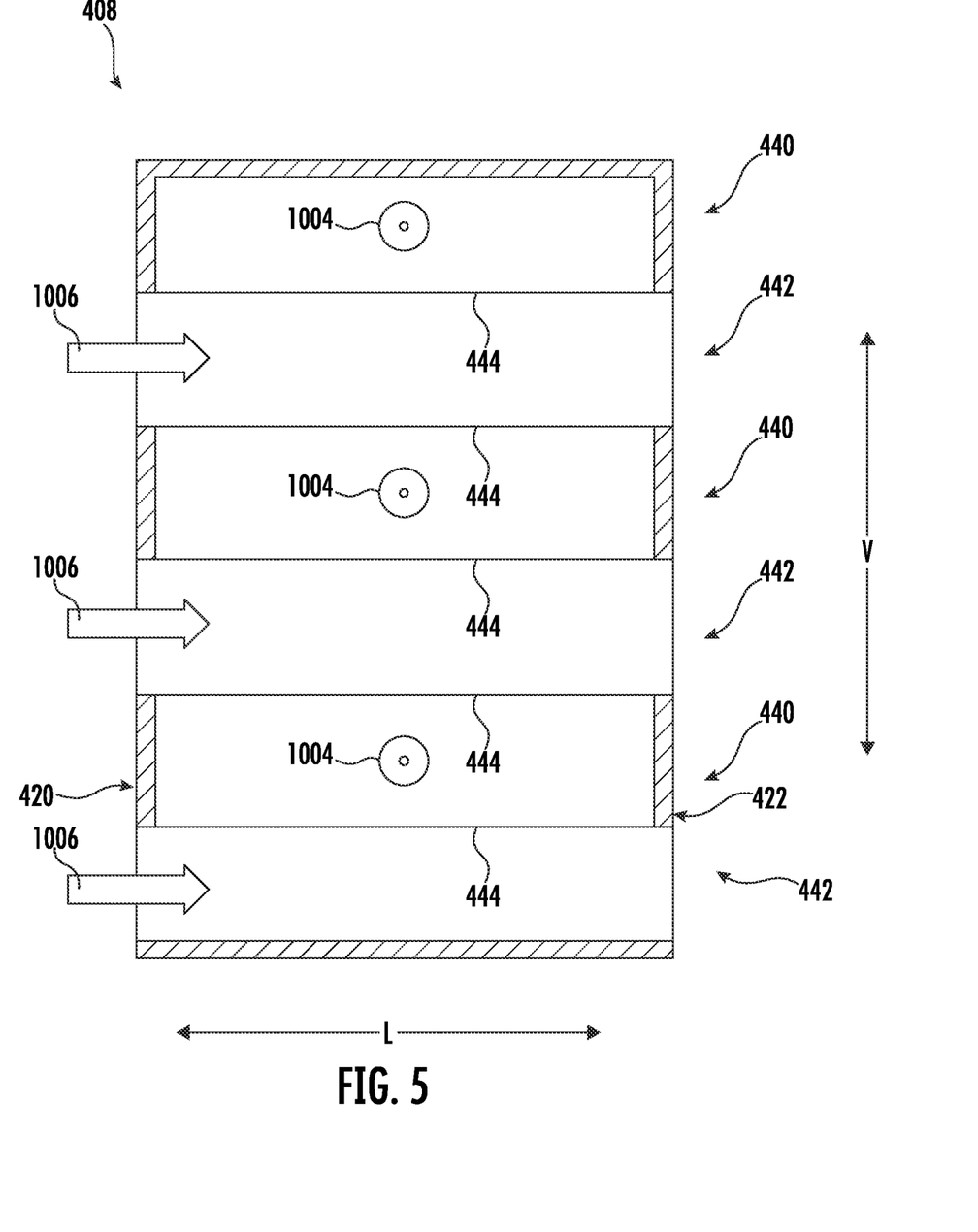
FIG. 5 provides another cross section view of the air to air heat exchanger of FIG. 4, where the cross section view of FIG. 5 is taken along a plane that is perpendicular to the section plane of FIG. 4.

As may be seen in FIG. 5, the air to air heat exchanger 408 may extend generally along the lateral direction L from the second inlet side 420 to the second outlet side 422. Also as may be seen in FIG. 5, the bottom layers 442 may provide fluid communication from the second inlet side 420 to the second outlet side 422, whereby the exhaust air 1006 flows through the bottom layers 442 of the air to air heat exchanger 408. The cross-flow through the air to air heat exchanger 408 may also be seen in FIG. 5, where the intake air 1004 flows generally perpendicularly to the exhaust air 1006, e.g., the intake air 1004 flows out of the page in the view of FIG. 5, while the exhaust air 1006 flows from left to right across the page in the view of FIG. 5.

As mentioned above, the top layers 440 and the bottom layers 442 are divided from each other. For example, the top layers 440 and the bottom layers 442 may be so divided by a membrane film 444. The membrane film 444 may be permeable, such that the membrane film 444 permits the exchange of both latent and sensible heat, as described above, from the intake air 1004 to the exhaust air 1006.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An air conditioner unit defining a mutually-perpendicular vertical direction, lateral direction, and transverse direction, the air conditioner unit comprising:
    a housing defining an outdoor portion and an indoor portion;
    an outdoor heat exchanger assembly disposed in the outdoor portion and comprising an outdoor heat exchanger and an outdoor fan;
    an indoor heat exchanger assembly disposed in the indoor portion and comprising an indoor heat exchanger and an indoor fan;
    a compressor in fluid communication with the outdoor heat exchanger and the indoor heat exchanger to circulate a refrigerant between the outdoor heat exchanger and the indoor heat exchanger;
    a makeup air intake duct disposed entirely above the housing, the makeup air intake duct having an intake inlet and an intake outlet, whereby the makeup air intake duct provides makeup air to a conditioned space;
    a makeup air exhaust duct disposed entirely above the housing, the makeup air exhaust duct having an exhaust inlet and an exhaust outlet, whereby the makeup air intake duct provides exhaust air to an outdoor space;
    an air intake connector duct extending from a first end to a second end at the indoor portion; and
    an air to air heat exchanger positioned above the housing, the air to air heat exchanger comprising:
        a first inlet side attached to the intake outlet of the makeup air intake duct, a second inlet side, a first outlet side, and a second outlet side directly attached to the exhaust inlet of the makeup air exhaust duct, wherein the first inlet side and the second inlet side are perpendicular and adjacent to one another, and wherein the first outlet side and the second outlet side are perpendicular and adjacent to one another; and
        one or more top layers alternating with one or more bottom layers along the vertical direction, wherein each top layer is divided from each bottom layer, the one or more top layers in fluid communication with the first inlet side and the first outlet side of the air to air heat exchanger, and the one or more bottom layers in fluid communication with the second inlet side and the second outlet side of the air to air heat exchanger,
    wherein the first end of the air intake connector duct is directly attached to the first outlet side of the air to air heat exchanger, whereby outdoor air is directly provided to the indoor portion via the makeup air intake duct, the air to air heat exchanger, and the air intake connector duct.

2. The air conditioner unit of claim 1, wherein each top layer is divided from each bottom layer of the air to air heat exchanger by a membrane film.

3. The air conditioner unit of claim 1, further comprising an exhaust damper within the makeup air exhaust duct.

4. The air conditioner unit of claim 3, further comprising a variable speed exhaust fan within the makeup air exhaust duct and downstream of the exhaust damper.

5. The air conditioner unit of claim 1, further comprising a variable speed intake fan within the air intake connector duct.

6. The air conditioner unit of claim 5, further comprising an intake damper within the air intake connector duct and downstream of the variable speed intake fan.

7. The air conditioner unit of claim 1, wherein the first inlet side of the air to air heat exchanger is parallel to and opposite of the first outlet side of the air to air heat exchanger, wherein the first inlet side and the first outlet side are oriented generally along the lateral direction and spaced apart along the transverse direction, wherein the second inlet side of the air to air heat exchanger is parallel to and opposite of the second outlet side of the air to air heat exchanger, and wherein the second inlet side and the second outlet side are oriented generally along the transverse direction and spaced apart along the lateral direction.

8. The air conditioner unit of claim 1, further comprising a plenum attached to the housing, wherein the plenum defines an air channel to guide air therethrough.

9. The air conditioner unit of claim 8, wherein the plenum comprises a divider wall which separates a makeup air passage from the remainder of the air channel, wherein the makeup air passage is positioned upstream of the makeup air intake duct.

10. An air conditioner unit, comprising:
- a housing defining an outdoor portion and an indoor portion;
- an outdoor heat exchanger assembly disposed in the outdoor portion and comprising an outdoor heat exchanger and an outdoor fan;
- an indoor heat exchanger assembly disposed in the indoor portion and comprising an indoor heat exchanger and an indoor fan;
- a compressor in fluid communication with the outdoor heat exchanger and the indoor heat exchanger to circulate a refrigerant between the outdoor heat exchanger and the indoor heat exchanger;
- a makeup air intake duct disposed entirely above the housing, the makeup air intake duct having an intake inlet and an intake outlet, whereby the makeup air intake duct provides makeup air to a conditioned space;
- a makeup air exhaust duct disposed entirely above the housing, the makeup air exhaust duct having an exhaust inlet and an exhaust outlet, whereby the makeup air exhaust duct provides exhaust air to an outdoor space;
- an air intake connector duct extending from a first end to a second end at the indoor portion; and
- an air to air heat exchanger positioned above the housing, the air to air heat exchanger comprising:
  - a first inlet side attached to the intake outlet of the makeup air intake duct, a second inlet side, a first outlet side, and a second outlet side directly attached to the exhaust inlet of the makeup air exhaust duct, wherein the first inlet side and the second inlet side are perpendicular and adjacent to one another, and wherein the first outlet side and the second outlet side are perpendicular and adjacent to one another; and
  - one or more alternating top layers and bottom layers, wherein each top layer is divided from each bottom layer, the one or more top layers in fluid communication with the first inlet side and the first outlet side of the air to air heat exchanger, and the one or more bottom layers in fluid communication with the second inlet side and the second outlet side of the air to air heat exchanger, wherein the first end of the air intake connector duct is directly attached to the first outlet side of the air to air heat exchanger, whereby outdoor air is directly provided to the indoor portion via the makeup air intake duct, the air to air heat exchanger, and the air intake connector duct.

11. The air conditioner unit of claim 10, wherein each top layer is divided from each bottom layer of the air to air heat exchanger by a membrane film.

12. The air conditioner unit of claim 10, further comprising an exhaust damper within the makeup air exhaust duct.

13. The air conditioner unit of claim 12, further comprising a variable speed exhaust fan within the makeup air exhaust duct and downstream of the exhaust damper.

14. The air conditioner unit of claim 10, further comprising a variable speed intake fan within the air intake connector duct.

15. The air conditioner unit of claim 14, further comprising an intake damper within the air intake connector duct and downstream of the variable speed intake fan.

16. The air conditioner unit of claim 10, wherein the first inlet side of the air to air heat exchanger is parallel to and opposite of the first outlet side of the air to air heat exchanger, and wherein the second inlet side of the air to air heat exchanger is parallel to and opposite of the second outlet side of the air to air heat exchanger.

17. The air conditioner unit of claim 10, further comprising a plenum attached to the housing, wherein the plenum defines an air channel to guide air therethrough.

18. The air conditioner unit of claim 17, wherein the plenum comprises a divider wall which separates a makeup air passage from the remainder of the air channel, wherein the makeup air passage is positioned upstream of the makeup air intake duct.

* * * * *